United States Patent
Zhou et al.

(10) Patent No.: US 10,252,610 B2
(45) Date of Patent: *Apr. 9, 2019

(54) ELECTRIC VEHICLE AND FUEL CELL VEHICLE WITH RANKINE CYCLE

(71) Applicant: TOYOTA MOTOR ENGINEERING & MANUFACTURING NORTH AMERICA, INC., Erlanger, KY (US)

(72) Inventors: Feng Zhou, South Lyon, MI (US); Ercan Mehmet Dede, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 200 days.

This patent is subject to a terminal disclaimer.

(21) Appl. No.: 15/451,636

(22) Filed: Mar. 7, 2017

(65) Prior Publication Data

US 2018/0257479 A1    Sep. 13, 2018

(51) Int. Cl.
*B60K 11/04* (2006.01)
*B60L 11/18* (2006.01)
(Continued)

(52) U.S. Cl.
CPC ............. *B60K 11/04* (2013.01); *B60K 1/04* (2013.01); *B60K 7/0007* (2013.01);
(Continued)

(58) Field of Classification Search
CPC ........ B60K 11/04; B60K 1/04; B60K 7/0007; Y10S 903/904; B60Y 2400/112;
(Continued)

(56) References Cited

U.S. PATENT DOCUMENTS 6,323,613 B1    11/2001    Hara et al.
7,051,823 B2    5/2006    Bosch et al.
(Continued)

FOREIGN PATENT DOCUMENTS

FR      3 005 810 A1       11/2014
KR      10-201-0056969 A    6/2012
KR      10-2015-0071872 A   6/2015

*Primary Examiner* — Jared Fureman
*Assistant Examiner* — Michael Warmflash
(74) *Attorney, Agent, or Firm* — Oblon, McClelland, Maier & Neustadt, L.L.P.

(57) ABSTRACT

The electric vehicle including one or more in-wheel motors, a battery electrically coupled to one or more in-wheel motors, a power electronics including a DC-AC inverter, a AC-DC inverter, and a boost converter that receives DC power from the battery and supplies AC power to the one or more in-wheel motors, and a generator electrically coupled to the battery via the power electronics. Further, it includes a Rankine cycle system including a pump, a first valve having an input, a first output, and a second output connected to the pump, the generator, and the one or more in-wheel motors, respectively. A second valve having a first input connects to the generator, a second input connects the one or more in-wheel motors and an output delivers the working fluid to the power electronics. An expander receives the working fluid from at least one of the power electronics.

13 Claims, 7 Drawing Sheets

(51) Int. Cl.
*B60K 1/04* (2019.01)
*B60K 7/00* (2006.01)
*B60L 15/00* (2006.01)
*H01M 16/00* (2006.01)
*F25B 11/02* (2006.01)

(52) U.S. Cl.
CPC ....... *B60L 11/1805* (2013.01); *B60L 11/1874* (2013.01); *B60L 11/1877* (2013.01); *B60L 11/1892* (2013.01); *B60L 11/1896* (2013.01); *B60L 15/007* (2013.01); *F25B 11/02* (2013.01); *H01M 16/006* (2013.01); *B60L 2210/14* (2013.01); *B60L 2210/40* (2013.01); *B60Y 2306/05* (2013.01); *B60Y 2400/112* (2013.01); *B60Y 2400/202* (2013.01); *F25B 2400/14* (2013.01); *H01M 2250/20* (2013.01); *H01M 2250/402* (2013.01)

(58) Field of Classification Search
CPC .......... B60Y 2400/442; B60Y 2306/05; B60L 2210/40; B60L 2210/14; B60L 15/007; B60L 11/1874; B60L 11/1877; F25B 11/02; F25B 5/04; F25B 2600/2501; F25B 2400/14
See application file for complete search history.

(56) References Cited

U.S. PATENT DOCUMENTS

| | | | |
|---|---|---|---|
| 7,056,251 B2 * | 6/2006 | Ibaraki | B60K 6/44 |
| | | | 180/304 |
| 7,211,912 B2 | 5/2007 | Takenaka et al. | |
| 7,475,541 B2 | 1/2009 | Ibaraki et al. | |
| 8,739,531 B2 | 6/2014 | Teng et al. | |
| 9,030,063 B2 | 5/2015 | Rawlinson et al. | |
| 2007/0284157 A1 | 12/2007 | Heller et al. | |
| 2012/0119573 A1 * | 5/2012 | Turudic | B60L 7/14 |
| | | | 307/10.1 |
| 2013/0174544 A1 | 7/2013 | Valetutti | |
| 2016/0123637 A1 | 5/2016 | Moreno et al. | |
| 2016/0201520 A1 | 7/2016 | Zhou | |
| 2018/0257480 A1 * | 9/2018 | Zhou | B60K 11/04 |
| 2018/0257481 A1 * | 9/2018 | Zhou | B60K 11/04 |

* cited by examiner

ELECTRIC VEHICLE AND FUEL CELL VEHICLE WITH RANKINE CYCLE

BACKGROUND

Field of the Disclosure

This disclosure relates generally to improvements to fully electric vehicle or a fuel cell vehicle. More particularly the present disclosure relates to improving the efficiency of electric vehicles (EV) or fuel cell vehicles (FCV) by integrating Rankine Cycle system with other technologies such as power electronics cooling, turbocharging, and in-wheel motor.

Description of the Related Art

Electric vehicles (EV) have very high fuel economy and no carbon-dioxide ($CO_2$) emission. The electric vehicle includes battery that powers a motor to drive the vehicle. However, the components of the EVs produce substantial amount of heat and needs efficient cooling to extend the battery life as well as to improve the efficiency of the EV.

Another type of vehicle that does not produce harmful emissions includes a fuel cell vehicle, which is powered by a fuel cell. A fuel cell is an electrochemical device that converts chemical energy into electric energy. Fuel cell powered vehicles do not produce harmful gases such as carbon-di-oxide or NOx that cause air pollution. Thus, fuel cells are clean energy sources and considered to be a future energy source. The fuel cell vehicles generate a substantial amount of heat and need cooling to operate safely.

Thus, both the electric vehicles and the fuel cell vehicles generate a substantial amount of heat that requires a cooling system to operate the vehicle efficiently and safely. One such cooling system includes a system that operates on a Rankine cycle.

Rankine Cycle (RC) is a thermodynamic cycle that converts thermal energy into mechanical work and is commonly found in thermal power generation plants. A typical RC system includes four main components: an evaporator; an expander; a condenser; and a pump connected to form a flow loop of a typical RC system. The pump drives a working fluid to circulate through the loop, and the evaporator utilizes a waste heat source to vaporize the working fluid. The fluid vapor expands in the expander and converts thermal energy into mechanical power output. Then, the expanded vapor flows through a condenser to convert back into liquid phase, thus completing the cycle.

SUMMARY

According to an embodiment of the present disclosure, there is provided an electric vehicle. The electric vehicle includes one or more in-wheel motors, a battery electrically coupled to one or more in-wheel motors, a power electronics including a DC-AC inverter, a AC-DC inverter, and a boost converter that receives DC power from the battery and supplies AC power to the one or more in-wheel motors, and a generator electrically coupled to the battery via the power electronics. Further, the electric vehicle includes a Rankine cycle system. The Rankine cycle system includes a pump driving a working fluid through the Rankine cycle system, a first three-way valve having an input receiving working fluid from the pump, a first output delivering the working fluid to the generator, and a second output delivering the working fluid to the one or more in-wheel motors, a second three-way valve having a first input receiving the working fluid from the generator, a second input receiving the working fluid from the one or more in-wheel motors and an output delivering the working fluid to the power electronics, an expander receiving the working fluid from at least one of the power electronics and the second three-way valve, and a radiator receiving the working fluid from the expander and cooling the working fluid thereof.

Further, according to an embodiment of the present disclosure, there is provided a fuel cell vehicle. The fuel cell vehicle includes a fuel cell stack, one or more in-wheel motors, a battery electrically coupled to the fuel cell stack and supplying DC power to the one or more in-wheel motors, a power electronics including a DC-AC inverter, a AC-DC inverter, and a boost converter that receives power from the battery and supplies AC power to the one or more in-wheel motors, and a generator electrically coupled to the battery. Further, the fuel cell vehicle includes a Rankine cycle system. The Rankine cycle system includes a pump driving a working fluid through the Rankine cycle system, a first four-way valve having an input receiving working fluid from the pump, a first output delivering the working fluid to the generator, and a second output delivering the working fluid to the one or more in-wheel motors, and a third output delivering the working fluid to the fuel cell stack. The Rankine cycle also includes a second four-way valve having a first input receiving the working fluid from the generator, a second input receiving the working fluid from the one or more in-wheel motors, a third input receiving the working fluid from the fuel cell stack, and an output delivering the working fluid to the power electronics. Furthermore, the Rankine cycle includes an expander receiving the working fluid from at least one of the power electronics, and a radiator receiving the working fluid from the expander and cooling the working fluid thereof.

Further, according to an embodiment of the present disclosure, there is provided a Rankine cycle system. The Rankine cycle system includes a pump driving a working fluid through the Rankine cycle system, and a first three-way valve having an input receiving working fluid from the pump, a first output delivering the working fluid to a generator, and a second output delivering the working fluid to one or more in-wheel motors. Further the Rankine cycle includes a second three-way valve having a first input receiving the working fluid from the generator, a second input receiving the working fluid from the one or more in-wheel motors and an output delivering the working fluid to a power electronics, an expander receiving the working fluid from at least one of the power electronics and the second three-way valve, and a radiator receiving the working fluid from the expander and cooling the working fluid thereof.

Further, according to an embodiment of the present disclosure, there is provided an electric vehicle. The electric vehicle includes one or more in-wheel motors, a battery electrically coupled to the one or more in-wheel motors, a power electronics including a DC-AC inverter, a AC-DC inverter, and a boost converter that receives power from the battery and supplies AC power to the one or more in-wheel motors, and a generator electrically coupled to the battery via the power electronics, and a Rankine cycle system. The Rankine cycle system includes a pump pumping a working fluid to the generator followed by the one or more in-wheel motors followed by the power electronics, an expander receiving the working fluid from the power electronics, and a radiator receiving the working fluid from the expander and cooling the working fluid thereof.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

It is to be understood that terms such as "front," "rear," and the like that may be used herein merely describe points of reference and do not necessarily limit embodiments of the present disclosure to any particular orientation or configuration. Furthermore, terms such as "first," "second," "third," etc., merely identify one of a number of portions, components, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Typically, an electric vehicle (EV) has a simple structure with electrically coupled components including a battery, power electronics and a motor. On the other hand, a fuel cell vehicle (FCV) has more complicated structure, which includes high-pressure hydrogen tanks, drive battery, fuel cell stack, FC boost converter, power control unit and motor, further illustrated in FIG. 1.

Figure 1:
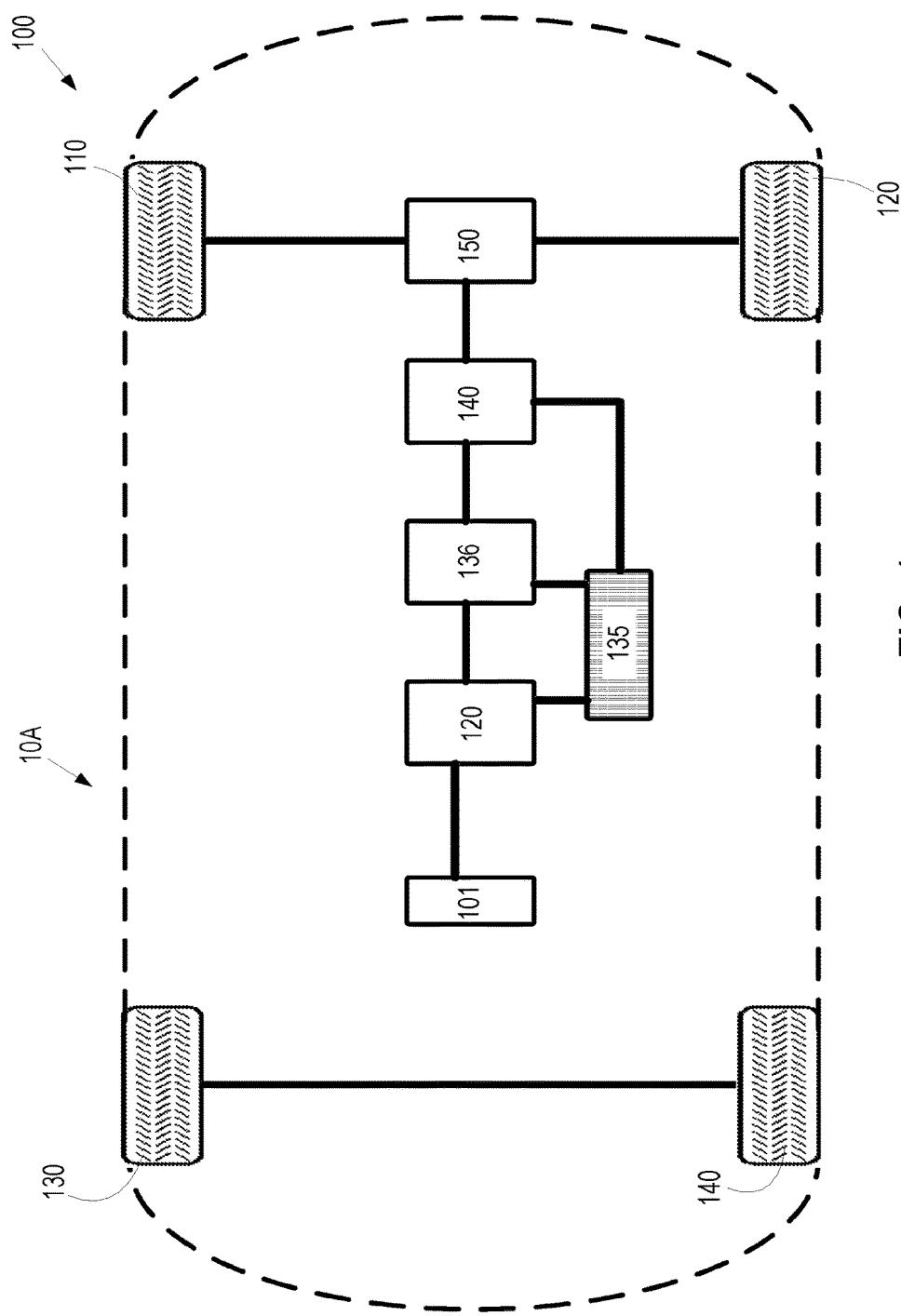
FIG. 1 is a schematic of a fuel cell vehicle according to an exemplary embodiment of the present disclosure.

FIG. 1 is a schematic of a conventional fuel cell vehicle 100 according to an exemplary embodiment of the present disclosure. The fuel cell vehicle 100 includes a vehicle body 10A, two front wheels 110 and 120, two rear wheels 130 and 140, a hydrogen tank 101, a fuel cell stack 120, a battery 135, a boost converter 136, a power control unit 140, and a motor 150.

The hydrogen tank 101 supplies hydrogen to the fuel cell stack 120 to generate electric current (or power) through a chemical reaction between the hydrogen and oxygen. The electric current can be transmitted to the boost converter 136 that boosts the electric current. The electric current is then transmitted to the motor 150 via the power control unit 140 to drive the front wheels 110 and 120.

The power control unit 140 is a circuitry configured to control the amount of electric power transmitted to the motor to drive the vehicle. The power control unit 140 can also control the charging of the battery 135. Alternatively or in addition, the power control unit 140 can extract power from the fuel cell stack 120, the battery 135 or both depending on the driving conditions. The power control unit 140 includes an inverter that converts DC into AC to power the motor and a DC/DC converter that draws current from and recharges the battery 135, among other systems. The power control unit 140 exercises precise control over fuel cell power output and battery discharging and recharging under various driving conditions.

Furthermore, the power control unit 140 can be connected to a boost converter 136, which can boost the batter) voltage (approximately 200V) to higher voltage (approximately 650V).

Figure 6A:
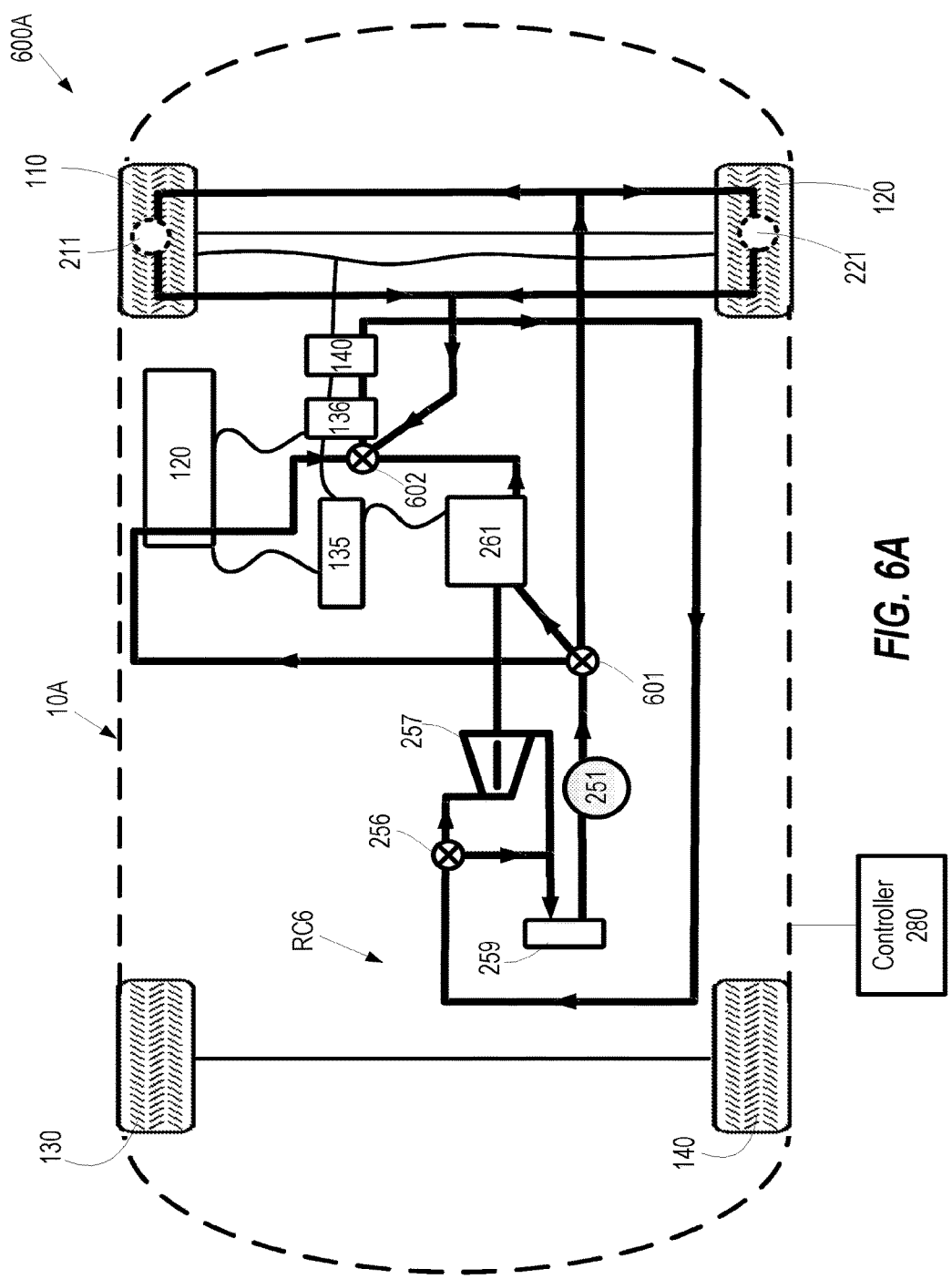
FIG. 6A is a schematic of a fuel cell vehicle incorporating a fifth Rankine Cycle system according to an exemplary embodiment of the present disclosure.
Figure 6B:
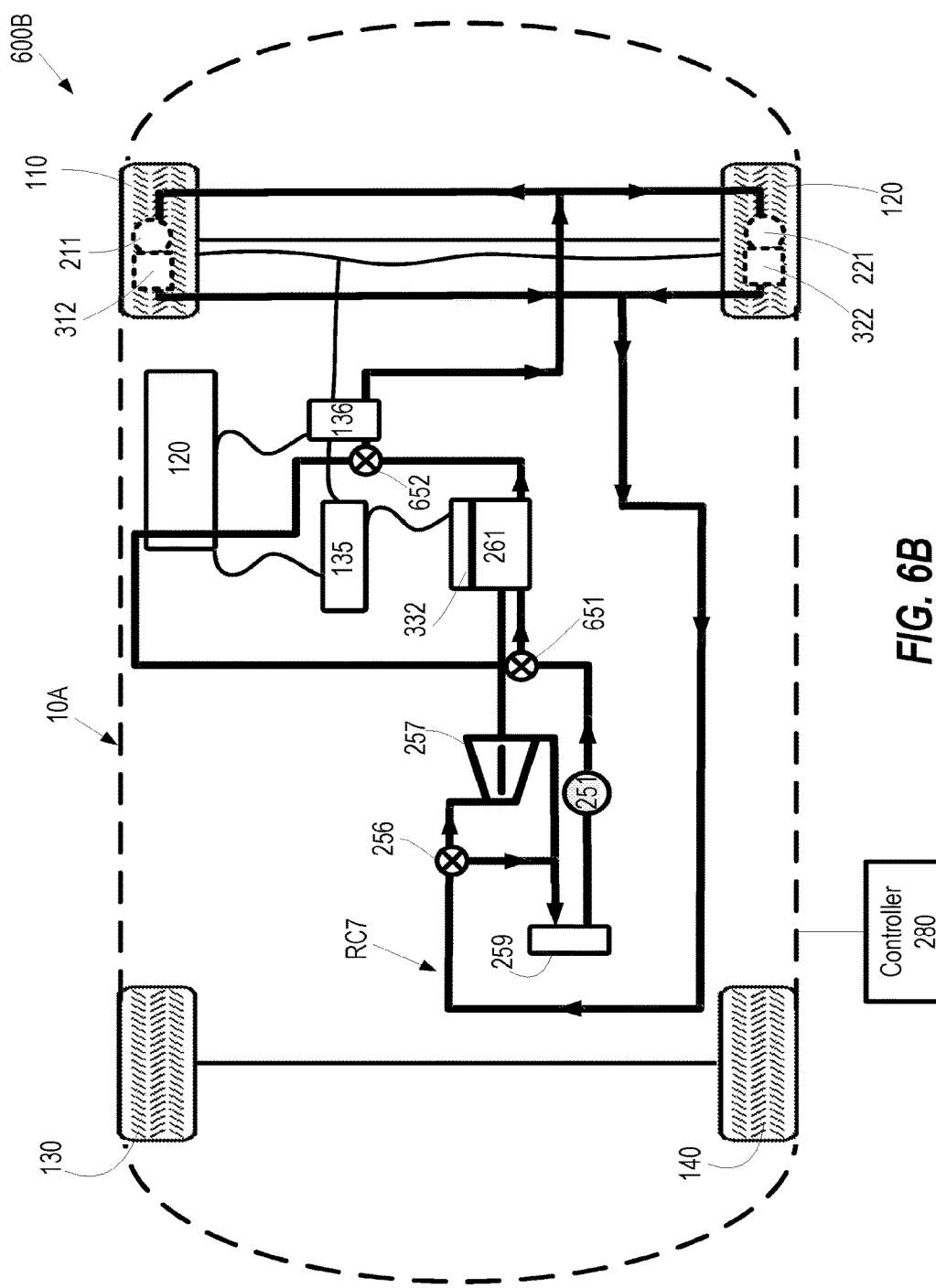
FIG. 6B is a schematic of a fuel cell vehicle incorporating a sixth Rankine Cycle system according to an exemplary embodiment of the present disclosure.

In operation, the components of the conventional fuel cell vehicle 100 including the fuel cell stack 120, the boost converter 136, the power control unit 140, and the motor 150 can generate substantial heat and should be cooled for efficient operation. Example cooling systems for FCVs based on Rankine cycle are illustrated in FIGS. 6A and 6B and discussed in detail later in the present disclosure.

Similarly, an electric vehicle can generate substantial heat and should be cooled for efficient operation. Example cooling systems based on Rankine cycle are illustrated in FIGS. 2-5 configured to cool an electric vehicle according to the present disclosure.

In the present disclosure, the electric and the fuel cell vehicles are front vehicle drive for discussion purposes only and do not limit the scope of the disclosure. It can be appreciated by a person skilled in art that the present disclosure can be applied to other type of vehicles such as vehicles with a rear wheel drive, and all-wheel drive.

Figure 2:
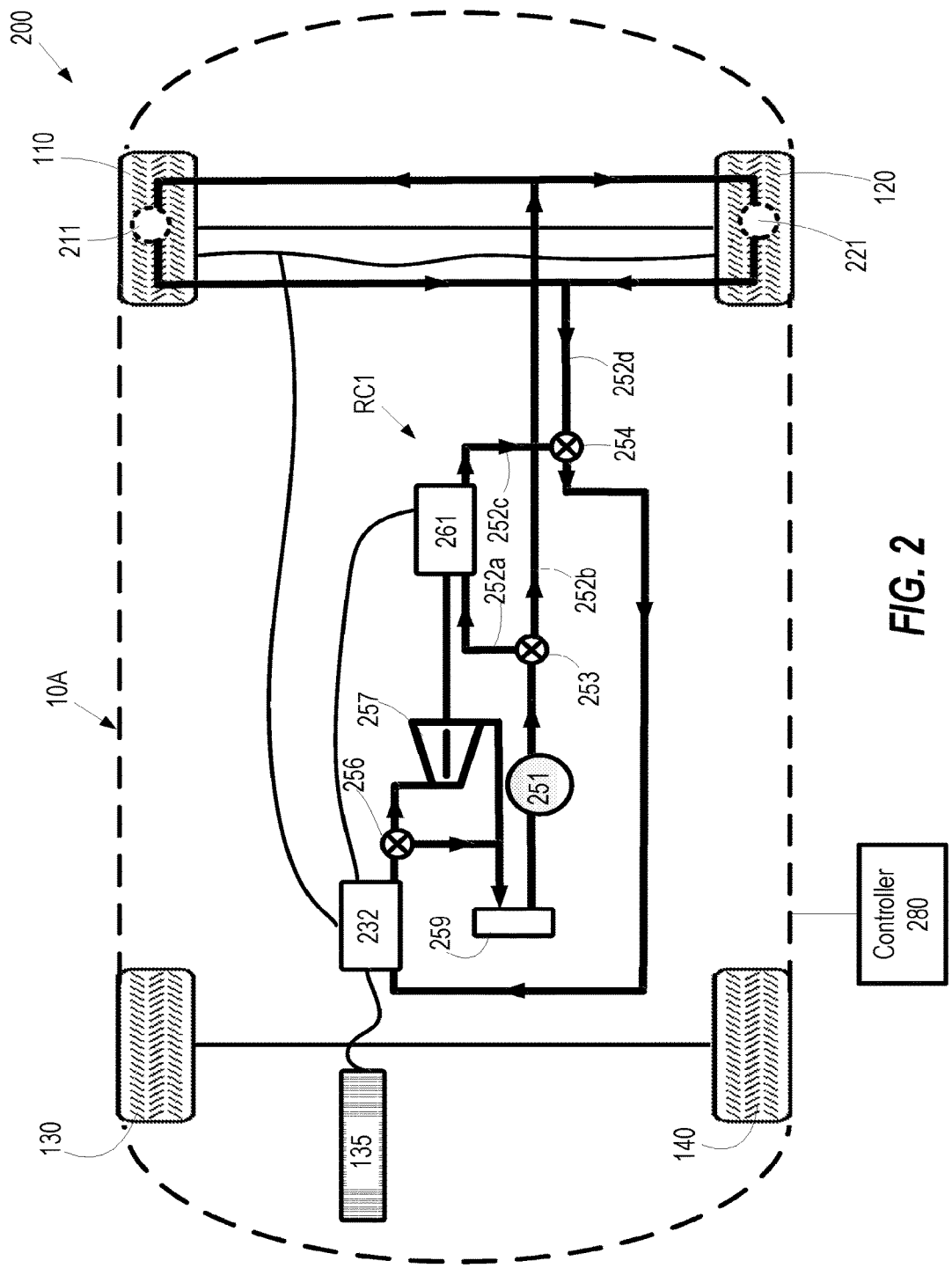
FIG. 2 is a schematic of an electric vehicle incorporating a first Rankine Cycle system according to an exemplary embodiment of the present disclosure.

FIG. 2 is schematic of an electric vehicle 200 incorporating a first Rankine, Cycle system RC1 according to an exemplary embodiment of the present disclosure. The electric vehicle 200 includes a vehicle body 10A, two front wheels 110 and 120 fitted with in-wheel motors 211 and 221, respectively, two rear wheels 130 and 140, the battery 135, power electronics 232, and a generator 261 and the first Rankine Cycle system RC1 (referred as first RC system RC1, hereinafter).

The in-wheel motor 211 and 221 (also referred as wheel motor, wheel hub drive, hub motor or wheel hub motor) is an electric motor that is incorporated into a hub of a wheel and drives the wheel directly. The conventional electric vehicle includes one motor that drives a transmission system to supply the rotational input to the wheels. While, use of in-wheel motors 211 and 221 does not require additional transmission components that allows to save space and enable integration of the first RC system RC1 with the electric vehicle 200. Electric vehicles in the present disclosure include four wheels and two in-wheel motors. Alternatively, the electric vehicles can include two or more wheels fitted with two or more motors. For example, three motors for a three-wheeler, four motors in case of a four-wheeler, four motors in case of a six wheeler, etc.

The power electronics 232 is a device that can convert the electric power from a direct current (DC) to alternating current (AC) or vice-versa, and can boost the battery voltage to a higher value to drive the in-wheel motors 211 and 221. The power electronics 232 includes three components: DC-AC inverter that converts DC power from battery to AC power to drive the motors 211 and 221, AC-DC inverter that converts AC power from the generator 261 to DC power to charge the battery 135, and/or a boost converter 136 that boosts the battery voltage (approximately 200V) to higher voltage (approximately 650V) to power the motors 211 and 221. In the present disclosure, the DC-AC inverter can be integrated with in-wheel motors, the AC-DC inverter is integrated with generator, the boost converter 136 can be integrated with the battery or a combination thereof. The power electronics 232, in FIG. 2, the aforementioned power electronics components are assembled in a single unit.

In operation, the different components of the power electronics 232, and the generator 261 can generate a substantial amount of heat. As such, a cooling system is used to minimize the damage to the components of the power electronics 232.

A conventional cooling system, typically used to cool an engine of an automobile, includes three components: a heat exchanger (water jacket of engine); a radiator; and a pump. The electric vehicles are projecting an increasing demand of higher performance combined with small sized power electronics module resulting in an increased heat dissipation requirement and a better and efficient cooling system that can be accommodated in the hybrid vehicle with limited space for additional components. The present disclosure illustrates different variations of a RC system integrated with the electric vehicle in a compact and efficient manner.

The first RC system RC1 includes a pump 251, a first three-way valve 253, a second three-way valve 254, an expander 257, and a radiator 259. Optionally, a bypass valve 256 can be included. The aforementioned components are connected by a piping system to form a cooling loop for cooling the power electronic components. The pipes can transport a working fluid (also referred as a refrigerant) through different components of the first RC system RC1, the power electronics or other heat sources. A refrigerant such as R245fa, HFE7100, HFC 134a etc. is typically used as the working fluid in a two-phase power electronics cooling loop. Different fluids may be selected depending on the type of power devices and operating temperature.

The pump 151 can be a positive displacement type of pump, such as gear pump. However, the other appropriate pumps such as a centrifugal pump can be used and does not limit the scope of the present disclosure.

The radiator 159, different from that used to for engine cooling, has conduits through which the working fluid can flow and cool down to a liquid form due to conduction effect. The conduits can have circular or flat or any other shape of cross-section. The radiator 159 can have fins on the outside surface. The working fluid flows within the tube and air flows outside of the tube to carry away the heat.

The first three-way valve 253 has one input connected to the pump 251 and two output ports connected to pipes 252a and 252b, respectively. While, the second three-way valve 254 has two input ports connected to the pipes 252c and 252d, respectively, and one output port connected to the power electronics 232.

The pump 251 pumps the working fluid to the input of the first three-way valve 253. The first three-way valve 253 directs the working fluid via the pipe 252a to the generator 261 to extract heat from the generator 261. The first three-way valve 253 also directs the working fluid via the pipe 252b to the motors 211 and 221 to extract heat from the motors 211 and 221. As such, heat can be simultaneously extracted from more than one component such as the generator 261 and the motors 211 and 221.

From the generator 261, the working fluid is directed to the first input of the second three-way valve 254 via a pipe 252c. The second three-way valve 254 also receives the working fluid from the motors 211 and 221 via the pipe 252d. As such, the second three-way valve 254 can simultaneously receive working fluid (in a heated state) from more than one component such as the generator 261 and the motors 212 and 221. Thus, providing two three-way valves can allow cooling of multiple components, and can improve the thermal efficiency of the electric vehicle 200.

The second valve 254 directs the working fluid to the power electronics 232 to extract heat from the power electronics 232. The working fluid is then directed to the expander 257, which is coupled to the generator 261, for example, via a shaft. The working fluid (which is in a form of a vapor-liquid mixture) flows into the expander 257 and expands producing mechanical output. The output from the expander 257 can be input to the generator 261 via a shaft to generate electricity. The electricity generated can be used to charge the battery 135.

From the expander 257 the working fluid is passed to the radiator 259. The working fluid is passed through the radiator 259 to cool the working fluid and convert it to a liquid state before passing the working fluid to the pump 251. The radiator 259 is a commonly used component in an automobile.

Optionally, a bypass valve 256 can be included at an input side of the expander 257. The bypass valve 256 can allow the working fluid to bypass the expander 257 and direct the working fluid to the radiator 259, when the vehicle is not running or when no electricity needs to be generated at the generator 261.

The pump 251 can be powered by the battery 135 or other power source. Further, the pump 251 can receive input commands such as ON and OFF from a controller 280. The controller 280 is a circuitry configured to control the pump 251, the first three-way valve 253, the second three-way valve 254, the bypass valve 256, or a combination thereof to control the flow of the working fluid through the first RC system RC1. The controller 280 can be an electronic control unit (ECU), commonly used in electric vehicles. The functions of the controller 280 such as switching a pump ON and OFF, and controlling the opening and closing of the valves 253, 254 and/or 256 can be implemented in as a separate circuitry or as sub-module of the ECU.

The controller 280 can receive data from different sensors such as a temperature sensor (not illustrated), a pressure sensor (not illustrated), ignition sensor (not illustrated), etc. One or more temperature sensor can detect the temperature of working fluid and/or the temperature of the power electronics 232. The pressure sensor can detect the pressure of the working fluid. The ignition sensor can detect whether the electric vehicle 200 is on or off. Based the on the sensor data, the controller 280 can determine the control command. For example, if temperature of the power electronics increases (or decrease), the controller 280 can increase (or decrease) the speed of the pump 251 to increase (or decrease) the flow rate of the working fluid through the first RC system RC1, thus allowing fast (or slow) cooling of the power electronics. If the ignition is off, the controller 280 can close the bypass valve 256. Further, the controller 280 can implement optimization algorithms to optimize the cooling process of the power electronics 232.

Figure 3:
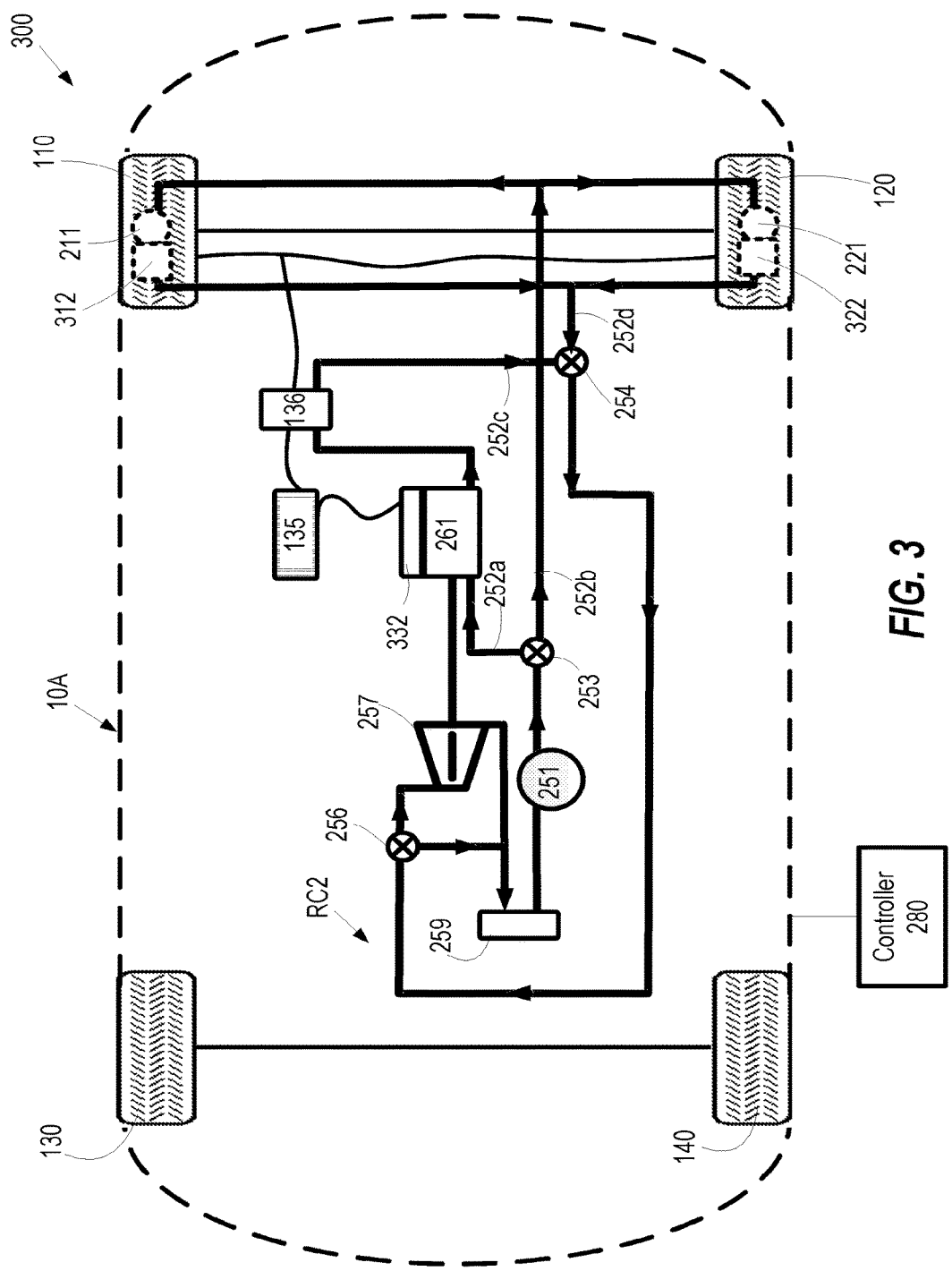
FIG. 3 is a schematic of an electric vehicle incorporating a second Rankine Cycle system according to an exemplary embodiment of the present disclosure.

FIG. 3 illustrates an electric vehicle 300 incorporating a second Rankine Cycle system RC2 according to an exemplary embodiment of the present disclosure. In the electric vehicle 300, the power electronics components are separated and integrated with the generator 261 and the motors 211 and 221. For example, the AC-DC inverter 332 is integrated with the generator 261 and the DC-AC inverters 312 and 322 are integrated with the motors 211 and 221, respectively.

The second RC system RC2 includes the pump 251, the first three-way valve 253, the second three-way valve 254, the expander 257, and the radiator 259. Optionally, a bypass valve 256 can be included. The aforementioned components are connected by a RC piping system to form a cooling loop, similar to that in FIG. 2.

The pump 251 pumps the working fluid to the input of the first three-way valve 253. The first three-way valve 253 directs the working fluid via the pipe 252a to the generator 261, which is integrated with the AC-DC inverter 332. The working fluid extracts heat from the generator 261 and the AC-DC inverter 332, thus increasing the temperature of the working fluid.

The first three-way valve 253 also directs the working fluid via the pipe 252b to the DC-AC inverters 312 and 322, and the motors 211 and 221. The working fluid extracts heat from the DC-AC inverters 312 and 322, and the motors 211 and 221, thus increasing the temperature of the working fluid.

From the generator 261, the working fluid is passed through the boost converter 136 to the second three-way valve 254 via the pipe 252c. Additionally, the second three-way valve 254 receives the working fluid via the pipe 252d from the DC-AC inverters 312 and 322. As the second three-way valve 254 receives the working fluid from two different sources, the second three-way valve 254 can allow mixing of the working fluid at different temperatures.

The second three-way valve 254 further directs the working fluid to the expander 257 producing mechanical work, which is can be used to drive the generator 261. From the expander 257, the working fluid passes through the radiator 259, which converts the working fluid to a liquid state and passes to the pump 251.

Furthermore, the controller 280 can be configured to control the operation of the second RC system RC2 in a similar manner as discussed earlier with respect to the first RC system RC1.

Figure 4:
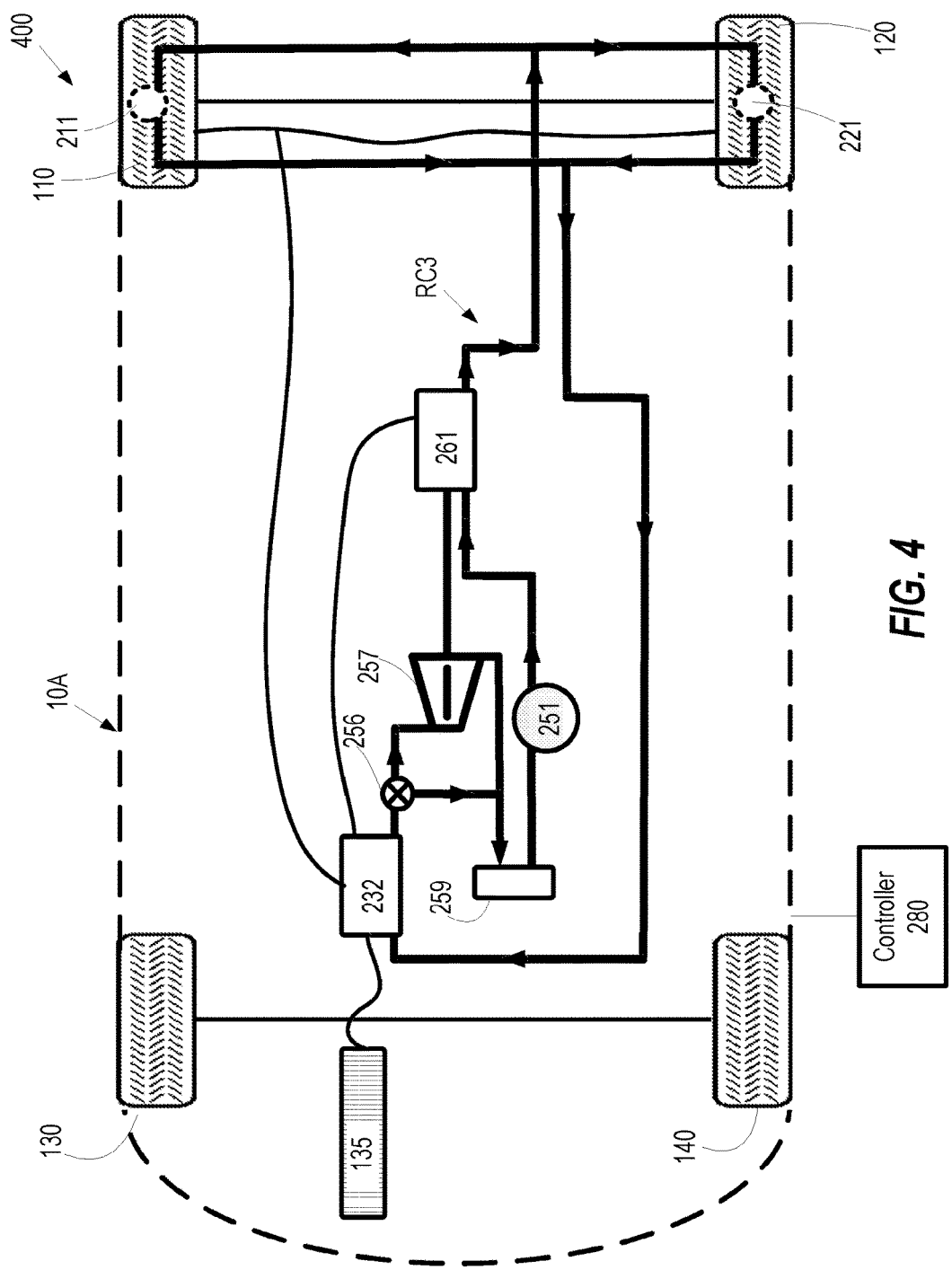
FIG. 4 is a schematic of an electric vehicle incorporating a third Rankine Cycle system according to an exemplary embodiment of the present disclosure.

FIG. 4 illustrates an electric vehicle 400 incorporating a third Rankine Cycle system RC3 according to an exemplary embodiment of the present disclosure. The electric vehicle 400 has a similar construction as the electric vehicle 200, except that electric vehicle 400 incorporates the third Rankine Cycle system RC3 (referred as third RC system RC3 hereinafter) that circulates the working fluid in a sequential manner through different components connected in a series.

The third RC system RC3 includes the pump 251, the expander 257, and the radiator 259. Optionally, a bypass valve 256 can be included. The working fluid of the third RC system RC3 has a series flow path. In the series flow path, the working fluid is circulated through the components of the third RC system RC3 and power electronics in a sequential manner, i.e., unlike in FIGS. 2 and 3, the working fluid is not split to pass through two different components at the same time.

In operation, the working fluid flows from the pump 251 to the generator 261 followed by the motors 211 and 221 followed by the power electronics 232. Further, the working fluid expands in the expander 257, and further passes through the radiator 259. The working fluid extracts heat from different components along the flow path and is finally cooled to a liquid state by the radiator 259.

Alternatively, a series flow path, similar to that in the third RC system RC3, can be applied to an electric vehicle 500. The electric vehicle 500 includes the power electronics whose components are separated and integrated with the generator 261 and the motors 211 and 221 as illustrated in FIG. 5.

Figure 5:
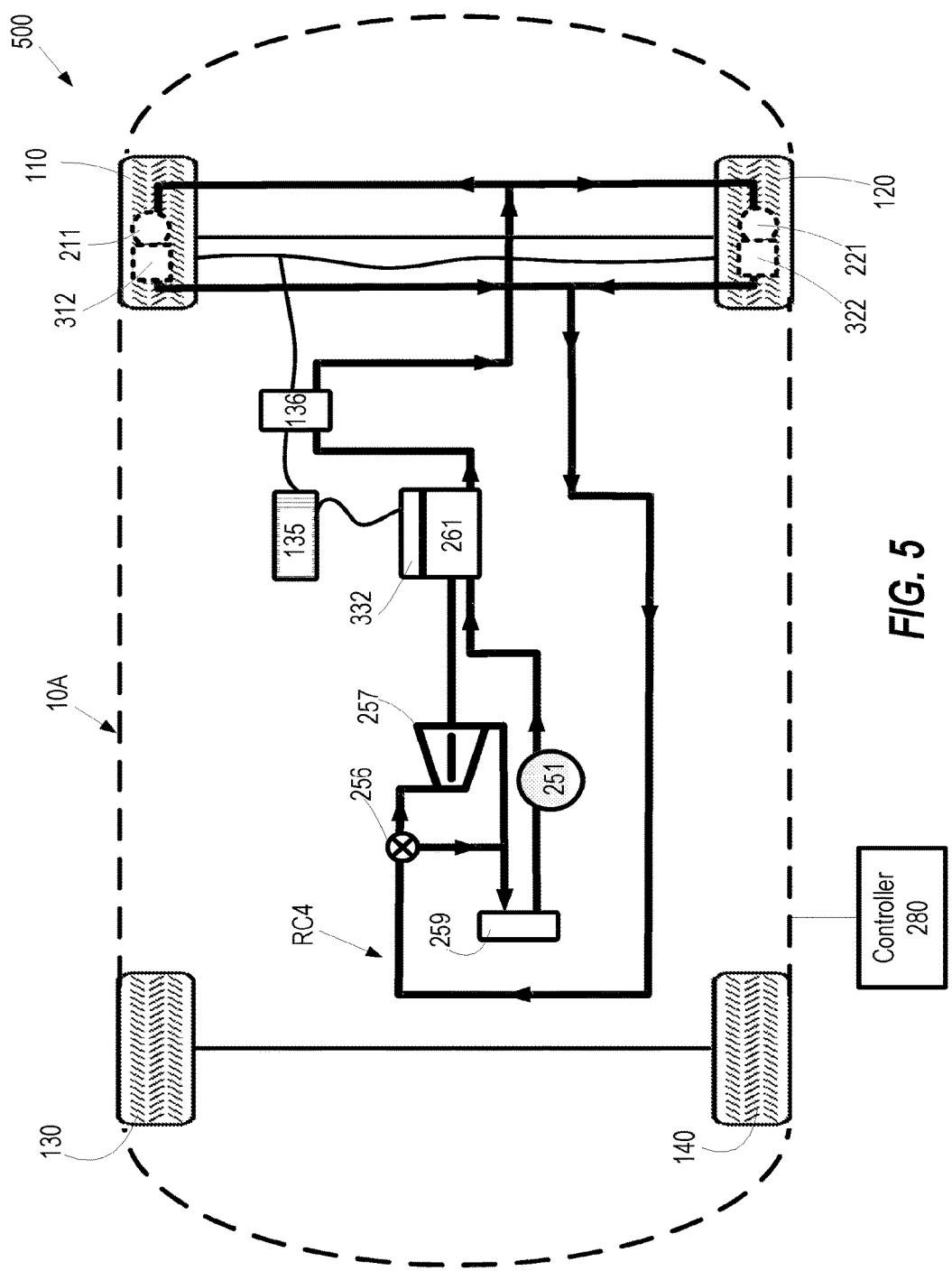
FIG. 5 is a schematic of an electric vehicle incorporating a fourth Rankine Cycle system according to an exemplary embodiment of the present disclosure.

FIG. 5 implements a fourth RC system RC4 similar to the third RC system RC3. The working fluid is circulated through different components in a series. In operation, the pump 251 pumps to the generator 261, which is integrated with the AC-DC inverter 332, extracting heat from both the generator 261 and the AC-DC inverter 332. From the generator 261, the working fluid is passed through the boost converter 136 followed by the motors 211 and 221, The motors 211 and 221 are integrated with the DC-AC inverters 312 and 322, respectively. Thus, the working fluid extracts heat generated from both the motors 211 and 221 and the DC-AC inverters 312 and 322. Further, the working fluid expands in the expander 257, and further passes through the radiator 259, The working fluid extracts heat from different components and is finally cooled to a liquid state by the radiator 259.

The series flow path of the RC systems RC3 and RC4 differs from a flow path of the RC systems RC1 and RC2. The series flow path includes less number of components (e.g., no three-way valves) compared to the parallel flow path RC systems. As such, the series flow path based RC systems such as the RC3 and RC4 can be cost effective.

In the parallel flow path, the working fluid circulates in two loops created by the first three-way valves 253 that allows heat extraction from the generator 261 (and/or the AC-DC inverter 332) and the motors 211 and 221 (and/or the DC-AC inverters 312 and 322) simultaneously, as opposed to in series. Further, the second three-way valve 254 allows mixing of the working fluid received from the generator 261 (and/or the AC-DC inverter 332) and the motors 211 and 221 (and/or the DC-AC inverters 312 and 322) at different temperatures.

The parallel flow path includes additional components such as the three-way valves 253 and 254 and a more complex piping system making the RC systems such as the RC1 and RC4 expensive. However, the simultaneous cooling of different components and mixing of the working fluid at different temperatures allows the RC systems RC1 and RC2 to achieve a better thermal efficiency compared to the RC systems RC3 and RC4.

FIG. 6A is a schematic of a fuel cell vehicle 600A incorporating a fifth Rankine Cycle system RC5 according to an exemplary embodiment of the present disclosure. The fuel cell vehicle 600A includes the fuel cell stack 120, the battery 135, the boost converter 136, the power control unit 140 and the fifth Rankine Cycle system RC5.

The fifth RC system RC5 includes a pump 251, a first four-way valve 601, a second four-way valve 602, an expander 257, and a radiator 259. The aforementioned components are connected by a piping system to form a cooling loop for cooling the power electronic components and other related components. The fifth RC system RC5 includes a flow path that allows simultaneous cooling of multiple components.

The first four-way valve 601 has one input port and three output ports. The input port is connected to the pump 251 and receives the working fluid from the pump 251. The three outputs are connected to the fuel cell stack 120, the generator 261, and the in-wheel motors 211 and 221, respectively, delivering the working fluid to the respective components. As such, the first four-way valve 601 allows simultaneous cooling of multiple components.

The second four-way valve 602 has three input ports and one output port. The input ports are connected to the fuel cell stack 120, the generator 261, and the in-wheel motors 211 and 221, respectively, and receive the working fluid from the respective components. The output port is connected to the boost converter 136 and delivers the working fluid to the boost converter 136. The second four-way valve 602 allows simultaneous mixing of working fluid received from multiple components reducing the temperature variations within the fifth RC system RC5 and improving the thermal efficiency.

In operation, the pump 251 pumps the working fluid to the first four-way valve 601. The first four-way valve 601 simultaneously delivers the working fluid to the fuel cell stack 120, the generator 261, and the in-wheel motors 211 and 221. Consequently, the working fluid simultaneously extracts heat from the fuel cell stack 120, the generator 261, and the in-wheel motors 211 and 221. Due to the heat, the temperature of the working fluid increases and can form a vapor-liquid mixture.

From the fuel cell stack 120, the generator 261, and the in-wheel motors 211 and 221, the working fluid is transported simultaneously, to the second four-way valve 602 causing mixing of the working fluid at different temperatures. The second four-way valve 602 delivers the working fluid to the boost converter 136 and the power control unit 140 cooling the respective components. Subsequently, the working fluid is transported to the expander 257, where the working fluid expands generating mechanical output, which is used to run the generator 261. The working fluid from the expander 257 is then passed through the radiator 259, where the working fluid is cooled and brought to liquid state.

In one embodiment, illustrated in FIG. 6B, the power electronics components can be separated and integrated with the generator 261 and the motors 211 and 221. For example, the AC-DC inverter 332 is integrated with the generator 261, and the DC-AC inverters 312 and 322 are integrated with the motors 211 and 221, respectively. In FIG. 6B, a fuel cell vehicle 600B includes a sixth RC system RC6 configured to cool the power electronics and other related components. The sixth RC system RC6 includes a pump 251, a third three-way valve 651, a fourth three-way valve 652, an expander 257, and a radiator 259.

The third three-way valve 651 has one input port and two output ports. The input port is connected to the pump 251 receiving the working fluid from the pump 251. The two output ports are connected to the fuel cell stack 120 and the generator 261, respectively, delivering the working fluid to the respective components. As the working fluid passes through the generator 261, the generator 261 as well as the AC-DC inverter 332 is cooled. The heat extracted raises the temperature of the working fluid. Similarly, the working fluid extracts heat from the fuel cell stack 120 that increases the temperature of the working fluid.

The fourth three-way valve 652 has two input ports and one output port. The input ports are connected to the fuel cell stack 120 and the generator 261, respectively, receiving the working fluid from the respective components. The output port is connected to the boost converter 136 delivering the working fluid to the boost converter 136. As such, the fourth three-way valve 652 allows simultaneous mixing of working fluid received from multiple components, thus reducing the temperature variations within the sixth RC system RC6.

In operation, the pump 251 pumps the working fluid to the third three-way valve 651. The third three-way valve 651 simultaneously delivers the working fluid to the fuel cell stack 120 and the generator 261. Consequently, the working fluid simultaneously extracts heat from the fuel cell stack 120 and the generator 261. Due to the heat, the temperature of the working fluid increases and can form a vapor-liquid mixture.

From the fuel cell stack 120 and the generator 261, the working fluid is transported simultaneously to the fourth three-way valve 652, where the working fluid mixes at different temperatures. The fourth three-way valve 652 further delivers the working fluid to the boost converter 136. Subsequently, the working fluid is passed through the in-wheel motors 211 and 221, and the AC-DC inverters 312 and 322 to extract heat from the respective components.

The working fluid is then passed to the expander 257, where the working fluid expands generating a mechanical output, which is used to run the generator 261. The working fluid from the expander 257 is then passed through the radiator 259, where the working fluid is cooled and brought to liquid state.

While certain embodiments have been described, these embodiments have been presented by way of example only, and are not intended to limit the scope of the present disclosures. Indeed, the novel apparatuses and systems described herein can be embodied in a variety of other forms; furthermore, various omissions, substitutions and changes in the form of apparatuses and systems described herein can be made without departing from the spirit of the present disclosures. The accompanying claims and their equivalents are intended to cover such forms or modifications as would fall within the scope and spirit of the present disclosures.

What is claimed is:

1. An electric vehicle comprising:
   one or more in-wheel motors;
   a battery electrically coupled to one or more in-wheel motors;
   power electronics including a DC-AC inverter, a AC-DC inverter, and a boost converter receiving DC power from the battery and supplying AC power to the one or more in-wheel motors;
   a generator electrically coupled to the battery via the power electronics; and
   a Rankine cycle system comprising
      a pump driving a working fluid through the Rankine cycle system,
      a first valve including an input receiving working fluid from the pump, a first output delivering the working fluid to the generator, and a second output delivering the working fluid to the one or more in-wheel motors, a second valve including a first input receiving the working fluid from the generator, a second input receiving the working fluid from the one or more in-wheel motors and an output delivering the working fluid to the power electronics, an expander receiving the working fluid from at least one of the power electronics and the second valve, and a radiator receiving the working fluid from the expander and cooling the working fluid thereof.

2. The electric vehicle according to claim 1, wherein the AC-DC inverter is integrated with the generator.

3. The electric vehicle according to claim 1, wherein the DC-AC inverter is integrated with the one or more in-wheel motors.

4. The electric vehicle according to claim 1, wherein the boost converter is integrated with the battery.

5. A fuel cell vehicle comprising:
a fuel cell stack;
one or more in-wheel motors;
a battery electrically coupled to the fuel cell stack and supplying DC power to the one or more in-wheel motors;
power electronics including a DC-AC inverter, a AC-DC inverter, and a boost converter receiving power from the battery and supplying AC power to the one or more in-wheel motors;
a generator electrically coupled to the battery; and
a Rankine cycle system comprising
a pump driving a working fluid through the Rankine cycle system,
a first valve including an input receiving working fluid from the pump, a first output delivering the working fluid to the generator, and a second output delivering the working fluid to the one or more in-wheel motors, and a third output delivering the working fluid to the fuel cell stack;
a second valve including a first input receiving the working fluid from the generator, a second input receiving the working fluid from the one or more in-wheel motors, a third input receiving the working fluid from the fuel cell stack, and an output delivering the working fluid to the power electronics,
an expander receiving the working fluid from the power electronics, and
a radiator receiving the working fluid from the expander and cooling the working fluid thereof.

6. The fuel cell vehicle according to claim 5, wherein the AC-DC inverter is integrated with the generator.

7. The fuel cell vehicle according to claim 6, wherein the DC-AC inverter is integrated with the one or more in-wheel motors.

8. The fuel cell vehicle according to claim 7, wherein the boost converter is integrated with the battery.

9. A Rankine cycle system comprising:
a pump driving a working fluid through the Rankine cycle system;
a first valve including an input receiving working fluid from the pump, a first output delivering the working fluid to a generator, and a second output delivering the working fluid to one or more in-wheel motors;
a second valve including a first input receiving the working fluid from the generator, a second input receiving the working fluid from the one or more in-wheel motors and an output delivering the working fluid to a power electronics;
an expander receiving the working fluid from at least one of the power electronics and the second valve; and
a radiator receiving the working fluid from the expander and cooling the working fluid thereof.

10. An electric vehicle comprising:
one or more in-wheel motors;
a battery electrically coupled to the one or more in-wheel motors;
power electronics including a DC-AC inverter, a AC-DC inverter, and a boost converter that receives power from the battery and supplies AC power to the one or more in-wheel motors;
a generator electrically coupled to the battery via the power electronics; and
a Rankine cycle system comprising
a pump pumping a working fluid to the generator followed by the one or more in-wheel motors followed by the power electronics,
an expander receiving the working fluid from the power electronics, and
a radiator receiving the working fluid from the expander and cooling the working fluid thereof.

11. The electric vehicle according to claim 10, wherein the AC-DC inverter is integrated with the generator.

12. The electric vehicle according to claim 10, wherein the DC-AC inverter is integrated with the one or more in-wheel motors.

13. The electric vehicle according to claim 10, wherein the boost converter is integrated with the battery.

* * * * *